Nov. 14, 1950     D. GRACEY ET AL     2,529,934
CUTTER ATTACHMENT FOR TRACTORS
Filed May 20, 1949     4 Sheets-Sheet 4
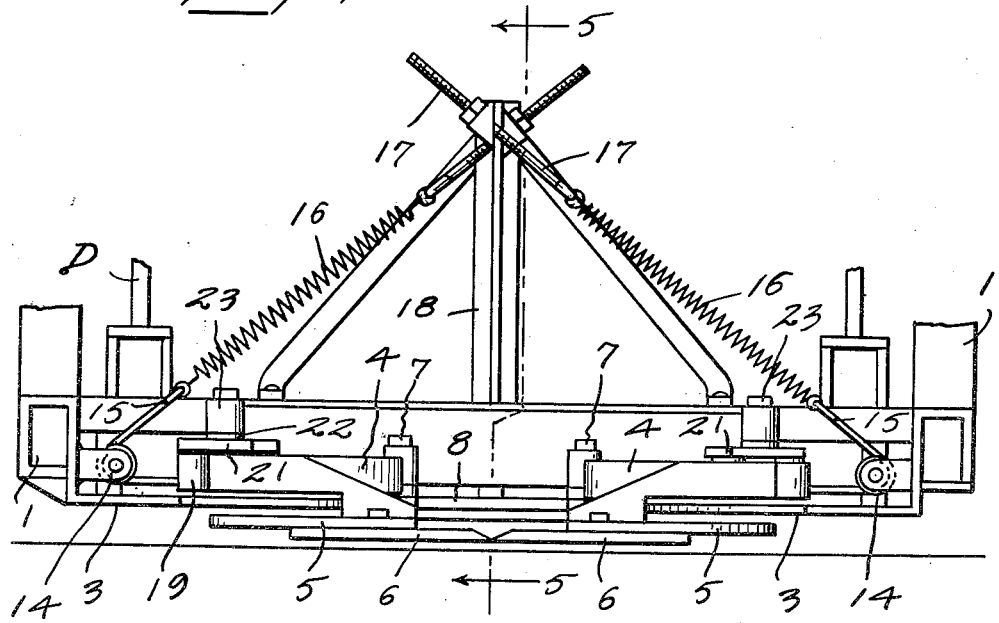
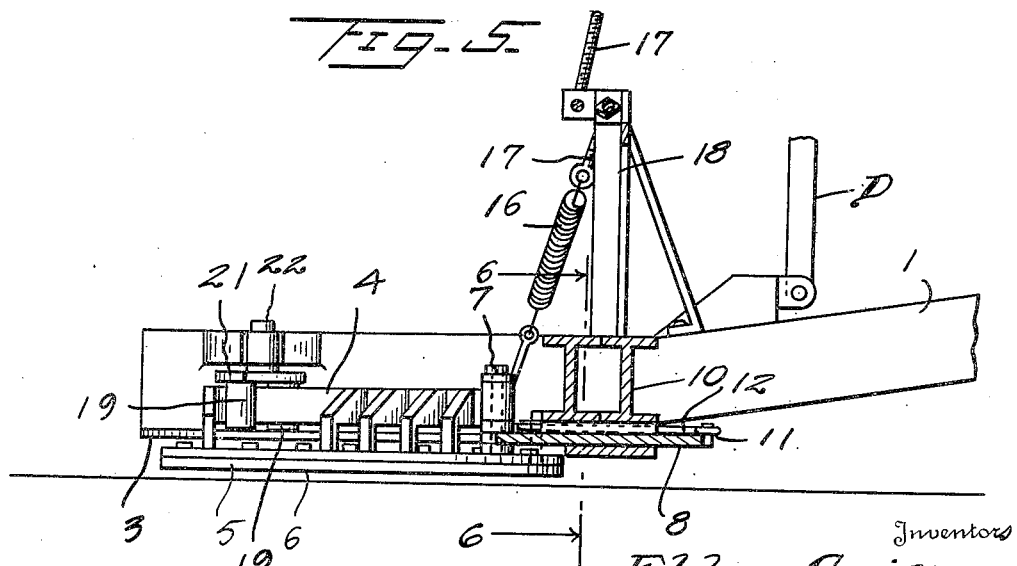
Inventors
Eldon Cain
Dale Gracey
Attorney Patented Nov. 14, 1950

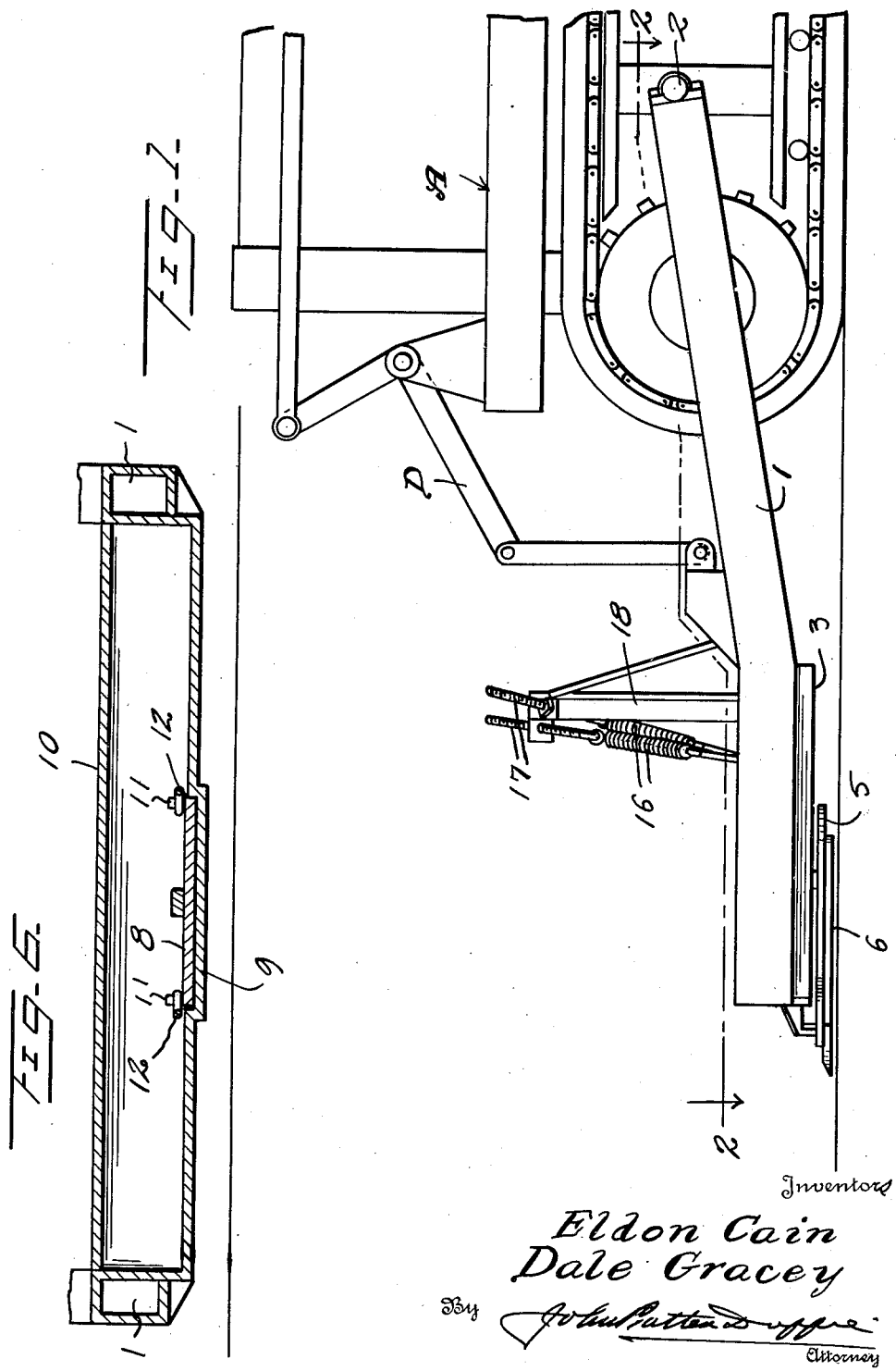

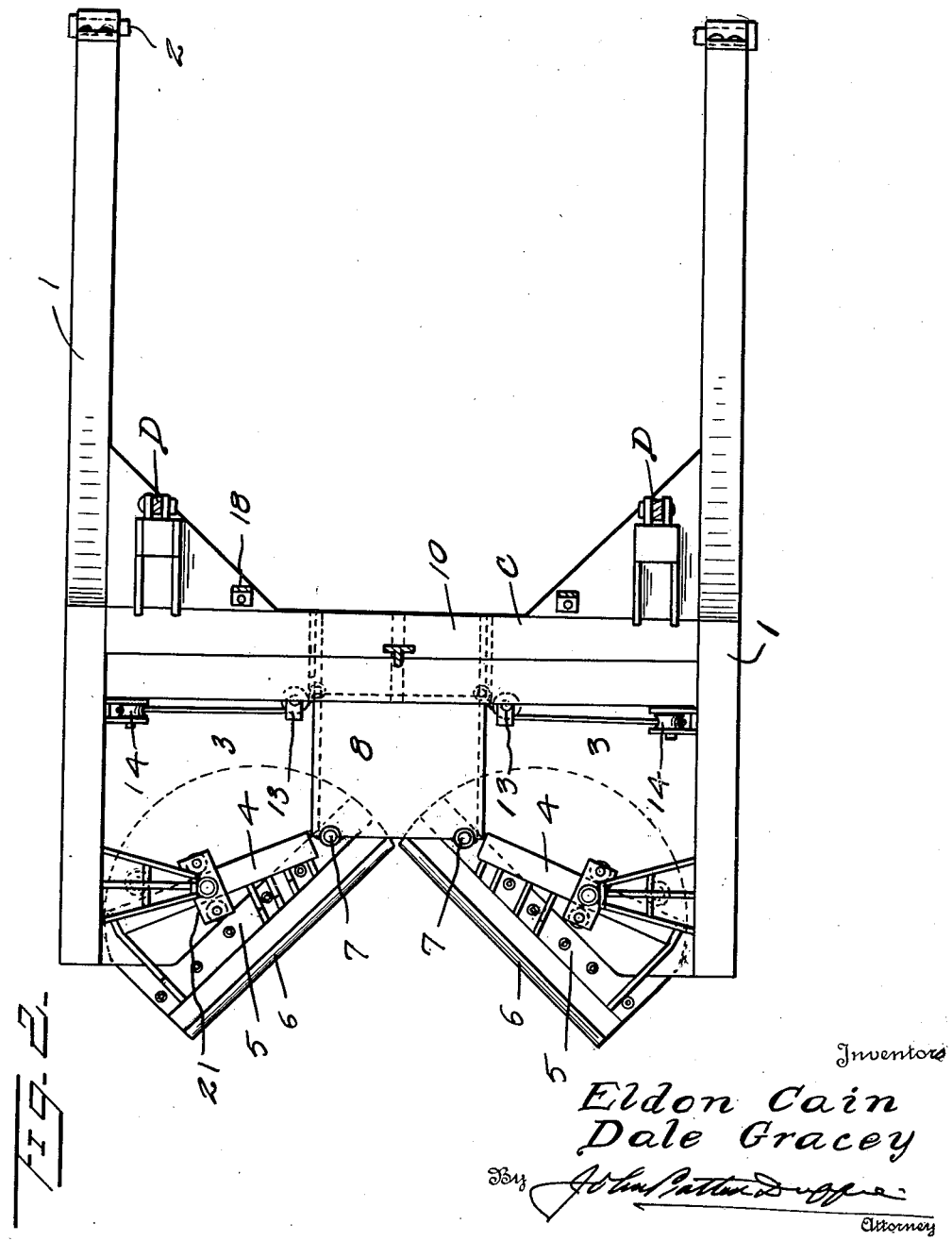

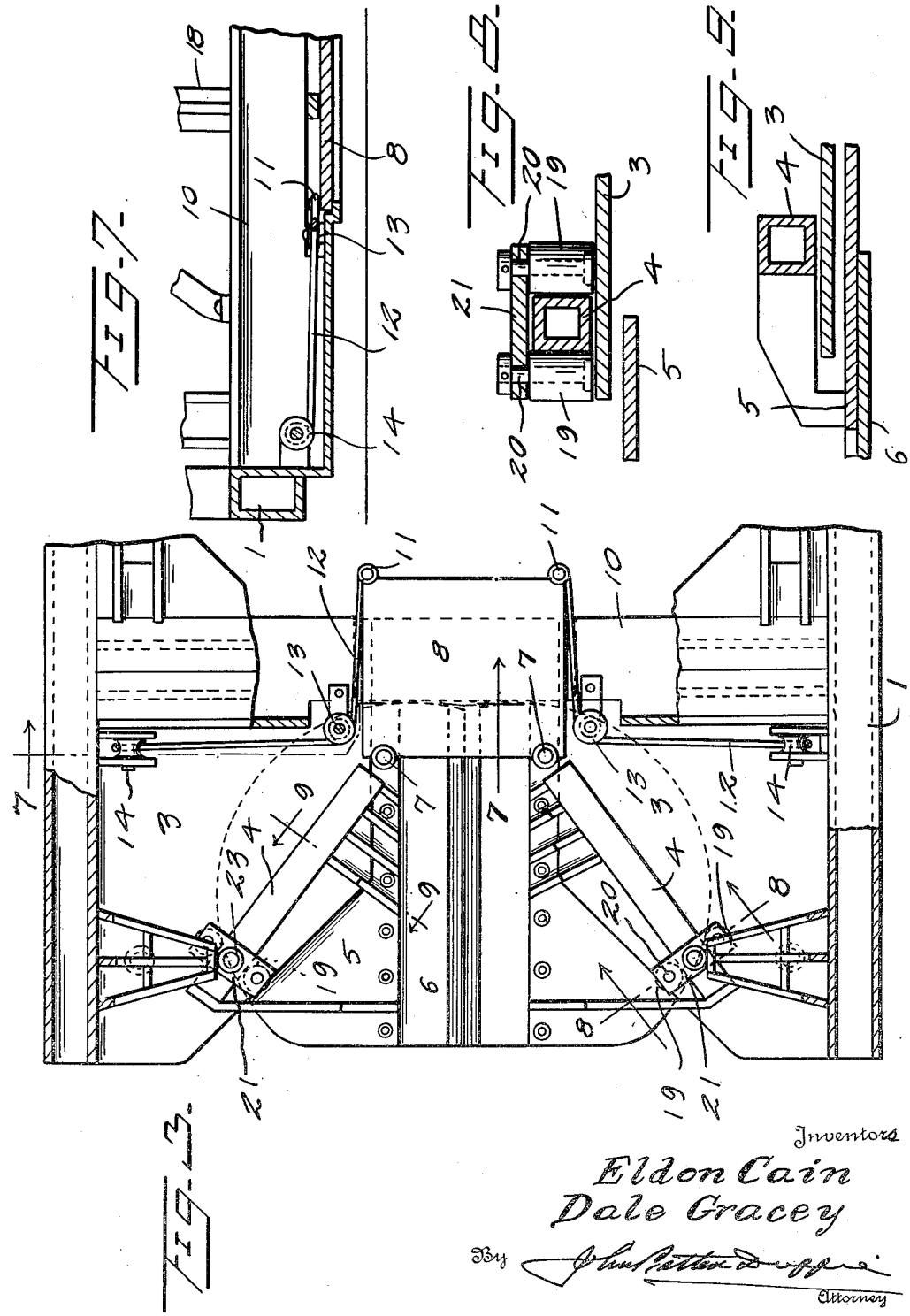

2,529,934

UNITED STATES PATENT OFFICE 2,529,934

CUTTER ATTACHMENT FOR TRACTORS

Dale Gracey, Osceola, and Eldon Cain, Leon, Iowa

Application May 20, 1949, Serial No. 94,452

1 Claim. (Cl. 144—34)

This invention relates to certain new and useful improvements in cutter attachments for tractors.

The primary object of our invention is to provide a cutter attachment of the character specified, adapted for use in clearing trees, scrub growth, under-brush and hedge from all kinds of terrain, and also useful in cutting pilings, fence posts and wooden objects or structures.

A further object of our invention is to provide a cutter attachment for tractors in which the cutting blades are controlled by novel means and the cutting operation performed at ground level.

A still further object of our invention is to provide a cutter attachment of the kind mentioned that is relatively simple and economical in construction and highly efficient and durable in use.

With the foregoing and other objects in view that will appear as the nature of our invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation, illustrating the application of our invention.

Figure 2 is a horizontal section, taken on line 2—2 of Figure 1.

Figure 3 is a fragmentary plan view of the cutter attachment, with the cutting blades closed and parts shown in section, and the parts represented on an enlarged scale.

Figure 4 is a front view, with the cutting blades closed.

Figure 5 is a vertical section, taken on line 5—5 of Figure 4.

Figure 6 is a vertical transverse section, taken on line 6—6 of Figure 5.

Figure 7 is a similar view, taken on line 7—7 of Figure 3.

Figure 8 is an enlarged diagonal section, taken on line 8—8 of Figure 3, and

Figure 9 is a similar view, taken on line 9—9 of Figure 3.

Referring to the drawings for a more particular description of our invention, and in which drawings like parts are designated by like reference characters throughout the several views, A designates a tractor of any ordinary or approved make and B our cutter attachment, as a whole.

Specifically, our cutter attachment comprises a supporting frame C, which may be constructed to fit any particular size or type of tractor and consists of the hollow metal side bars 1, pivotally connected at their rear ends, as at 2, to the tractor frame, and the horizontal base plates 3, formed at the front ends of the side bars and extending inwardly, leaving a central space between the inner edges of said base plates, the purpose of which will presently appear. The supporting frame C is suitably attached to the mechanical or hydraulic lift D of the tractor.

Diagonally disposed elongated blade closing arms 4 are operatively mounted on the upper faces of the horizontal base plates 3, and carry the blade holders 5, which in turn carry the oppositely disposed cutting blades 6. The blade holders 5 are pivoted at their inner rear corners, as at 7, to the front corners of the horizontal guide plate 8. The guide plate 8 works in a suitable guide-way 9 in the cross beam 10 of the supporting frame C, and is connected at its inner corners, as at 11, to the corresponding ends of the cables 12. The cables 12 work over the guide pulleys 13 and 14, respectively, journaled in suitable bearings carried by the supporting frame C and are connected at their opposite free ends, as at 15, to the lower ends of the upwardly extending diagonally disposed coil springs 16. The upper ends of the coil springs 16 are equipped with the diagonal eye bolts 17, having screw threaded engagement with the upper end of the perpendicular post 18 carried by the supporting frame C. The coil springs 16 and flexible connections described, serve to normally hold the cutting blades 6 in operative position, as illustrated in Figure 2 of the drawings.

The blade closing arms 4 work back and forth on the upper faces of the base plates 3 between corresponding pairs of diagonally spaced rollers 19, journaled to the vertical shafts 20, carried by the diagonally disposed top bearing plates 21. The bearing plates 21 are provided with central upwardly extending trunnions 22 working in tubular bearings 23 carried by the inner ends of the horizontal brackets 24 cast integral with the front ends and inner side edges of the side bars 1 of the supporting frame C.

In practice, the cutting blades 6 are normally maintained in open position, as illustrated in Figure 2 of the drawings, by the coil springs 16, but as the tractor moves forwardly and the cutting blades come into contact with a tree or other object disposed in their path of movement, the pressure of the tree or other object on the cutting blades forces the guide plate 8 to the rear against the tension of the coil springs 16. This action retracts the blade closing arms 4 from the position illustrated in Figure 2 of the drawings to that shown in Figure 3, and in so doing, closes the cutting blades and severs the object encountered. The blade closing arms 4 work back and forth between the corresponding pairs of rollers 19 and the bearing plates 21 oscillate on the trunnions 22 as fulcrums or pivots. This novel movement and oscillation of the blade closing arms 4 and rollers 19 is an important feature of our invention, since this facilitates the smooth efficient operation of the cutting blades. When the tree or other object is severed by the cutting blades, the latter are again instantly opened into normal cutting position by the action of the coil springs and ready for the next operation.

Our cutter attachment will find extensive use in clearing pasture and grazing land. Previous efforts in this direction with various types of machines employing a sawing or pushing principle of operation have been attempted, but these efforts have proved expensive, with the dis-advantage that the saws are pinched in the process of cutting and dulled if used at ground level. Attempts to push over trees and other growth have resulted in leaving considerable stumpage.

A deflector rack may be mounted over the forward portion of the tractor, if desired, to deflect falling trees from its path.

From the foregoing description taken in connection with the drawings, it is thought that the construction, operation and advantages of our invention will be readily understood, without requiring a more extended explanation.

Various changes in the form, proportions and minor details of construction may be resorted to without departing from the principle or sacrificing any of the advantages of our invention, as defined in the appended claim.

Having described our invention, what we claim as new and desire to secure by Letters Patent is:

In a cutter attachment for tractors, a supporting frame consisting of parallel side bars adapted to be hinged to the tractor frame and formed at their front ends with inwardly extending base plates, a pair of oppositely disposed cutting blades mounted at the front of the supporting frame and working under said base plates, a guide-plate mounted for end-wise movement in the supporting frame behind the cutting blades, diagonally disposed blade closing arms working on the upper faces of the base plates and loosely connected at their rear ends with the front corners of the guide-plate, blade holders carried by said blade closing arms and attached to the cutting blades, cables connected to the inner or rear corners of the guide-plate, coil springs connected with the free ends of the cables and normally maintaining the cutting blades in operative or cutting position, pairs of oscillating bearing rollers for the blade closing arms, top bearing plates for said bearing rollers and horizontal supporting brackets extending inwardly from the front ends of the side members of the supporting frame to which said top plates are journaled.

DALE GRACEY,
ELDON CAIN,

No references cited.